(12) United States Patent
Vogh, Jr. et al.

(10) Patent No.: US 9,823,131 B2
(45) Date of Patent: Nov. 21, 2017

(54) SAMPLE TARGET FOR IMPROVED ACCURACY OF COLOR MEASUREMENTS AND COLOR MEASUREMENTS USING THE SAME

(71) Applicant: X-Rite Switzerland GmbH, Regensdorf (CH)

(72) Inventors: James William Vogh, Jr., Boxford, MA (US); Jeremiah Snader, Londonderry, NH (US); Olivier Calas, Jr., Lowell, MA (US); Niti Yadav, Westford, MA (US); Leonel Fernando Mora, Westford, MA (US)

(73) Assignee: X-Rite Switzerland GmbH, Regensdorf (CH)

( * ) Notice: Subject to any disclaimer, the term of this patent is extended or adjusted under 35 U.S.C. 154(b) by 258 days.

(21) Appl. No.: 14/728,667

(22) Filed: Jun. 2, 2015

(65) Prior Publication Data

US 2016/0356651 A1    Dec. 8, 2016

(51) Int. Cl.
| | |
|---|---|
| *G01N 21/25* | (2006.01) |
| *G01J 3/51* | (2006.01) |
| *G01J 3/02* | (2006.01) |
| *G01J 3/36* | (2006.01) |
| *G01J 3/42* | (2006.01) |
| *G01J 3/52* | (2006.01) |

(52) U.S. Cl.
CPC ............... *G01J 3/51* (2013.01); *G01J 3/0205* (2013.01); *G01J 3/0275* (2013.01); *G01J 3/36* (2013.01); *G01J 3/42* (2013.01); *G01J 3/52* (2013.01)

(58) Field of Classification Search
CPC .. G01J 3/51; G01J 3/0275; G01J 3/524; G01J 3/506; G01J 3/46; G01J 3/52
See application file for complete search history.

(56) References Cited

U.S. PATENT DOCUMENTS

| | | |
|---|---|---|
| 5,177,694 A | 1/1993 | Graham et al. |
| 6,628,829 B1 * | 9/2003 | Chasen ............... G01J 3/46 382/165 |
| 6,925,205 B2 | 8/2005 | Leedham et al. |

(Continued)

FOREIGN PATENT DOCUMENTS

JP    2014-178211    9/2014

OTHER PUBLICATIONS

Zhao, et al., Image-Based Spectral Reflectance Reconstruction Using the Matrix R Method, Color research and application, vol. 32, No. 5, Oct. 2007.

(Continued)

*Primary Examiner* — Michael A Lyons
*Assistant Examiner* — Maurice Smith
(74) *Attorney, Agent, or Firm* — Hahn Loeser & Parks LLP

(57) ABSTRACT

Exemplary embodiments of the present disclosure are related to a color target and methods and systems for estimating a spectral reflectance of the color target based on an image of the color target. The color target can include a substrate having a target surface, a sample window formed in the substrate and defining perimeter within which a sample surface is disposed, and one or more filters disposed the sample surface. The one or more filters are configured to cover a first portion of the sample surface, while leaving a second portion of the sample surface uncovered.

23 Claims, 8 Drawing Sheets

(56) References Cited

U.S. PATENT DOCUMENTS

| | | | | |
|---|---|---|---|---|
| 7,057,155 B2* | 6/2006 | Tan | | G01J 3/50 |
| | | | | 250/226 |
| 7,372,571 B2* | 5/2008 | Lianza | | G01J 3/02 |
| | | | | 250/214 B |
| 7,435,943 B1* | 10/2008 | Chen | | G01J 3/51 |
| | | | | 250/214.1 |
| 7,522,767 B2 | 4/2009 | Baker et al. | | |
| 7,554,586 B1 | 6/2009 | Imai et al. | | |
| 7,586,642 B2* | 9/2009 | Chiba | | H04N 1/6033 |
| | | | | 358/1.9 |
| 8,094,879 B2 | 1/2012 | Kalla et al. | | |
| 8,274,051 B1* | 9/2012 | Aswell | | G01J 3/513 |
| | | | | 250/338.4 |
| 8,588,522 B2* | 11/2013 | Bhatti | | G06T 11/001 |
| | | | | 382/167 |
| 8,610,777 B2* | 12/2013 | Bengtsson | | G01J 3/52 |
| | | | | 348/187 |
| 8,743,137 B2 | 6/2014 | Peters et al. | | |
| 8,998,613 B2 | 4/2015 | Jung et al. | | |
| 2003/0169347 A1* | 9/2003 | Jenkins | | G01J 3/46 |
| | | | | 348/222.1 |
| 2004/0008969 A1* | 1/2004 | Wilsher | | G01J 3/51 |
| | | | | 386/303 |
| 2005/0072908 A1* | 4/2005 | Grunert | | G01J 3/513 |
| | | | | 250/226 |
| 2010/0282953 A1* | 11/2010 | Tam | | G01J 1/1626 |
| | | | | 250/226 |
| 2012/0250022 A1* | 10/2012 | Zhou | | G01J 3/0205 |
| | | | | 356/425 |
| 2012/0293803 A1* | 11/2012 | Arai | | G01J 3/1256 |
| | | | | 356/416 |
| 2014/0285806 A1 | 9/2014 | Haas | | |

OTHER PUBLICATIONS

Dec. 28, 2016 Office Communication in connection with EP 16 172 468.7.

Murakami et al., "Spectral Reflectance Estimation from Multi-Band Image Using Color Chart." Optics Communications 188:47-54 (Elsevier, Feb. 2001).

* cited by examiner

Curve two & derivatite of curve two

Curve one & derivatite of curve one

Two curves

SAMPLE TARGET FOR IMPROVED ACCURACY OF COLOR MEASUREMENTS AND COLOR MEASUREMENTS USING THE SAME

BACKGROUND

Accurately estimating the color appearance in a scene that has been photographed presents several challenges. There have generally been two approaches to estimating the color of a scene from a photograph of the scene. The first conventional approach is to understand the process of capturing the color well enough so that the colors in the scene can be estimated based on the colors captured in the photograph and knowledge of illumination source. For a digital camera this method would require knowledge of the camera's spectral sensitivity as well as any non-linearity associated with the camera. The second conventional approach is to place known colors in the scene and then create a transform from the captured colors to the known colors.

One modification of the first approach is to photograph a scene through more than the typical three filters. For example, an RGB camera (i.e. a camera that captures scenes in red, green, and blue) might photograph a scene through one or more filters so that six or more channels of data are generated. These multiple-channels of data can be used to estimate spectral values in the scene. Photographing the same locations in a scene with different filters with one exposure is a non-trivial task without specialized camera equipment. This is particularly true with respect to common smart-phone cameras which would require a complex optical element to photograph the same locations in a scene with a single exposure and different filters. Attempting to resolve the problem by using multiple exposures has the disadvantage of allowing possible changes in lighting and camera position to degrade accuracy of the estimation of spectral values in the scene. Further, in camera processing might introduce more inaccuracies.

SUMMARY

Exemplary embodiments of the present disclosure provide for measuring the spectral reflectance of a surface of a color target in a scene by processing an image of the scene including the color target having a sample surface that is partially covered by one or more filters. The filters over the surface allow the estimation of spectra for the surface.

In accordance with embodiments of the present disclosure, a color target is disclosed. The color target includes a substrate having a target surface, a sample window formed in the substrate and defining perimeter within which a sample surface is disposed, and one or more filters disposed over the sample surface. The one or more filters is configured to cover a first portion of the sample surface, while leaving a second portion of the sample surface uncovered.

In accordance with embodiments of the present disclosure, a method of estimating spectral reflectance is disclosed. This includes identifying a spectral sensitivity of an imaging device utilized to capture an image of color targets described herein; identifying one or more characteristics of a source of light in the environment within which the imaging device captured the image; identifying a model for the filter disposed over the sample surface; and executing an error function to minimize a difference between an observed response of the imaging device based on the image captured by the imaging device and a predicted response of the imaging device based on the spectral sensitivity of an imaging device, the one or more characteristics of a source of light, and the model for the filter to determine a spectral reflectance of the sample surface.

In accordance with embodiments of the present disclosure, a system for estimating a spectral reflectance of a surface captured in an image by an imaging device is disclosed. The system includes a non-transitory computer readable medium storing the image and a processing device. The processing device is programmed to identify a spectral sensitivity of an imaging device utilized to capture the image of color targets described herein; identify one or more characteristics of a source of light in the environment within which the imaging device captured the image; and identify a model for the filter disposed over the sample surface. The processing device is further programmed to execute an error function to minimize a difference between an observed response of the imaging device based on the image captured by the imaging device and a predicted response of the imaging device based on the spectral sensitivity of an imaging device, the one or more characteristics of a source of light, and the model for the filter to determine a spectral reflectance of the sample surface. In some embodiments, the non-transitory computer-readable medium and the processing device reside in the imaging device, and the processing device can be a digital signal processing device. In some embodiments, the non-transitory computer-readable medium and the processing device reside in a computing device.

In accordance with embodiments of the present disclosure, the color target can include one or more color patches disclosed in the target surface, a dark patch (e.g., a black patch) disposed on the target surface that is covered by at least one of the one or more filters which extends beyond the perimeter of the sample window, a dark patch disposed on the target surface that is covered by further filter disposed over the at least a portion of the dark patch. The further filter has a transmittance spectrum that is substantially identical to the transmittance spectrum of the filter.

In accordance with embodiments of the present disclosure, the one or more filters are configured to allow a substantial amount of light corresponding to color channels of an imaging device pass through the filter.

In accordance with embodiments of the present disclosure, the one or more filters are configured to filter substantial portions of light corresponding to color channels of an imaging device. In some embodiments, the filters can have a matte finish, in others they could be diffusion materials. In some embodiments, for each type of filter surface (glossy or matte) covering the color sample, there can be a filter of the same surface type covering a black patch.

In accordance with embodiments of the present disclosure, the one or more filters are disposed over the sample surface according to a quadrant arrangement. A first filter of the one or more filters can be disposed over the sample surface to cover a first quadrant of the sample surface. A second filter of the one or more filters can be disposed over the sample surface to cover a second quadrant of the sample surface. A third filter of the one or more filters can be disposed over the sample surface to cover a third quadrant of the sample surface. A fourth quadrant of the sample surface can be uncovered.

In accordance with embodiments of the present disclosure the processing device can be programmed to execute the error function by evaluating the following mathematical expression:

$$\mathrm{err} = \Sigma_{i=1}^{3}((o_i - \Sigma_{l=1}^{m} A(\lambda_l) R(\lambda_l) Q_i(\lambda_l))^2 + \Sigma_{k=1}^{n}(o_{i,k} - \Sigma_{l=1}^{m} E_{v,k}(\lambda_l) Q_i(\lambda_l))^2)$$

where err is an error that is to be minimized; $o_i$ is an observed camera response for channel i for the sample surface with no filter; $A(\lambda_l)$ is a spectral power distribution of the source of light; $R(\lambda_l)$ is a surface reflectance; $Q_i(\lambda_l)$ is a spectral sensitivity for channel i; $o_{i,k}$ is an observed camera response for channel i for the surface covered by an $n^{th}$ filter k, n is a number of filters; and $E_{v,k}$ is a predicted spectral power distribution from the sample surface covered by the $n^{th}$ filter k.

Any combination and permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF DRAWINGS

Exemplary embodiments of the present disclosure will be understood from the following detailed description when read with the accompanying figures. In the drawings, like reference numerals refer to like parts throughout the various views of the non-limiting and non-exhaustive embodiments of the present invention.

DETAILED DESCRIPTION

Exemplary embodiments of the present disclosure are related to a color target and estimating a spectral reflectance of the color target based on an image of the color target. The color target can include a substrate having a target surface, a sample window formed in the substrate and defining a perimeter within which a sample surface is disposed, and one or more filters disposed the sample surface. The one or more filters are configured to cover a first portion of the sample surface, while leaving a second portion of the sample surface uncovered.

Figure 1:
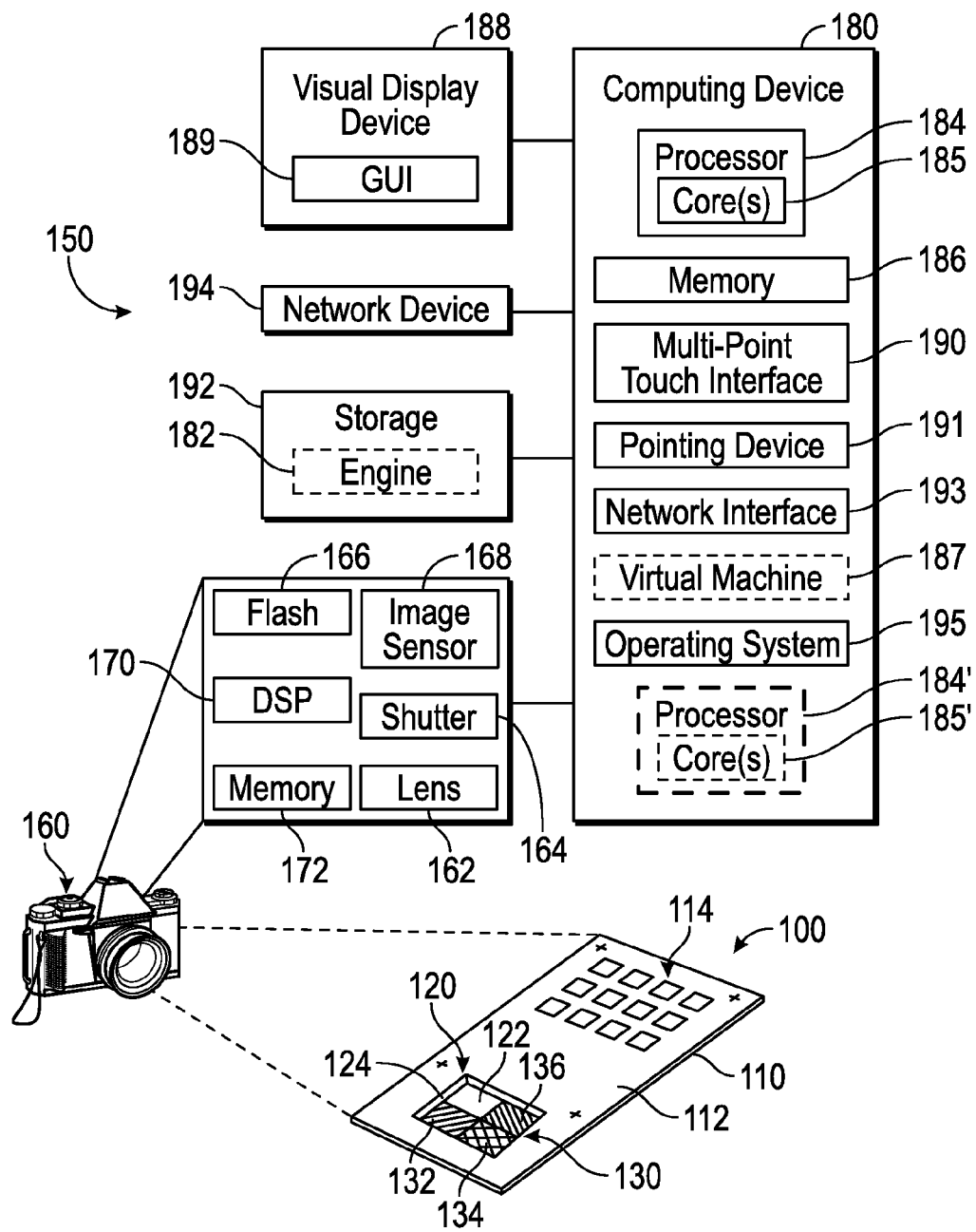
FIG. 1 depicts a color target substrate including a sample window that can be captured by an image capturing device in accordance with exemplary embodiments of the present disclosure.

FIG. 1 depicts a color target 100 and a spectra measurement system 150 in accordance with exemplary embodiments of the present disclosure. The color target 100 can be captured by an imaging device 160 of the spectra system, and be input to a computing device 180 that implements a spectral analysis engine 182. In some embodiments, the imaging device 160 can implement the spectral analysis engine 182.

The color target 100 can be defined by a substrate 110 having a (first) target surface 112 upon which one or more color patches 114 are formed. The substrate 110 of the color target 100 can include a sample window 120 having a (second) sample surface 122 that is recessed with respect to the target surface 112. The surfaces 112 and 122 can be formed in generally parallel planes such that the surfaces 112 and 122 are oriented in the same direction with each other.

The sample surface 122 of the sample window 120 can form a color sample have a color to be measured. One or more filters 130 can be disposed within the perimeter 124 of the sample window 120 over the sample surface 122 to cover at least a portion of the surface 122 and leave at least a portion of the surface 122 exposed. As a non-limiting example, the filters can have a quadrant arrangement with a first filter 132 disposed substantially in a first quadrant of the sample window 120 to obstruct a first portion of the surface 122, a second filter 134 disposed substantially in a second quadrant of the sample window 120 to obstruct a second portion of the surface 122, and a third filter 136 can be disposed substantially in a third quadrant of the sample window 120 to obstruct a third portion of the surface 122. The fourth quadrant of the sample window 120 can be unobstructed by the filters 132, 134, and 136 such that a forth portion of the surface 122 is exposed.

In exemplary embodiments, the filters 132, 134, and 136 can be formed have a transmittance corresponding to one or more colors. For example, in some embodiments, the filter 132 can be configured to have a first predominant transmittance to a range of wavelengths corresponding to one or more selected colors, the filter 134 can be configured to have a second predominant transmittance to a range of wavelengths that corresponds to one or more selected colors, and the filter 136 can be configured to have a third predominant transmittance to a range of wave lengths corresponding to one or more selected colors, where the transmittances and/or the range of wavelengths corresponding to the selected colors for the filters 132, 134, and 136 can be identical, similar, or different from each other. In some embodiments, the filters 132, 134, and 136 can be configured to have transmittance to a range of wavelengths that correspond to more than one color as described herein. In exemplary embodiments, the transmittance is chosen so that part of the color range to which an image sensor channel is sensitive is filtered and part of the color range to which the image sensor is sensitive is not filtered.

The imaging device 160 of the spectra measurement system 150 can be a digital still camera, that includes a lens 162, a shutter 164, a flash 166, an imaging sensor 168 (e.g., a CMOS imaging sensor or a charged coupled device (CCD) imaging sensor), a digital signal processor (DSP) 170, and memory 172, as well as, other components commonly included in digital still cameras including, for example, a display, timing generators, amplifiers, digital-to-analog converters, and the like. The imaging sensor 168 can include pixels having sensitivities to red, green, and blue components. The imagining device can capture images of embodiments of the color target. For example, an image of a color target can be formed as charges on pixels of the imaging sensor 168 by receiving light through the lens 162 when the shutter 164 is open. The charge on the pixels can be output by the sensor to the DSP 170 via one or more amplifier/gain stages, which can process the charge from the imaging sensor 168 to form the image captured by the imaging sensor 168 and store the image in the memory 172. In some embodiments, the DSP 170 can be programmed to implement embodiments of the spectral analysis engine 182, which can be stored in the memory 172, and/or the imaging device 160 can include another processing device (e.g., a microcontroller) that interfaces with the memory 172 and is programmed to implement the spectral analysis engine 182.

The computing device 180 can be configured to be in communication with the imaging device 160 to receive the image captured by the imaging device, and to process the image with the spectral analysis engine 182. The spectral analysis engine 182 can be implemented (e.g., by the imaging device 160 and/or the computing device 180) to estimate a spectral reflectance of the surfaces 112 and/or 122 of the color target 100. In exemplary embodiments, the computing device 180 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 186 included in the computing device 180 may store computer-readable and computer-executable instructions or software for implementing exemplary embodiments. The computing device 180 also includes processor 184 and associated core 185, and optionally, one or more additional processor(s) 184' and associated core(s) 185' (for example, in the case of computer systems having multiple processors/cores), for executing computer-readable and computer-executable instructions or software stored in the memory 186 and other programs for controlling system hardware. Processor 184 and processor(s) 185' may each be a single core processor or multiple core (185 and 185') processor.

Virtualization may be employed in the computing device 180 so that infrastructure and resources in the computing device may be shared dynamically. A virtual machine 187 may be provided to handle a process running on multiple processors so that the process appears to be using only one computing resource rather than multiple computing resources. Multiple virtual machines may also be used with one processor.

Memory 186 may include a computer system memory or random access memory, such as DRAM, SRAM, EDO RAM, and the like. Memory 186 may include other types of memory as well, or combinations thereof.

A user may interact with the computing device 180 through a visual display device 188, such as a computer monitor, which may display one or more user interfaces 189 that may be provided in accordance with exemplary embodiments. The computing device 180 may include other I/O devices for receiving input from a user, for example, a keyboard or any suitable multi-point touch interface 190, a pointing device 191 (e.g., a mouse). The keyboard 190 and the pointing device 191 may be coupled to the visual display device 188. The computing device 180 may include other suitable conventional I/O peripherals.

The computing device 180 may also include one or more storage devices 192, such as a hard-drive, CD-ROM, or other computer readable media, for storing data, such as images captured by the imaging device 160, and computer-readable instructions and/or software that implement exemplary embodiments of the spectral analysis engine 182 described herein.

The computing device 180 can include a network interface 193 configured to interface via one or more network devices 194 with one or more networks, for example, Local Area Network (LAN), Wide Area Network (WAN) or the Internet through a variety of connections including, but not limited to, standard telephone lines, LAN or WAN links (for example, 802.11, T1, T3, 56kb, X.25), broadband connections (for example, ISDN, Frame Relay, ATM), wireless connections, controller area network (CAN), or some combination of any or all of the above. The network interface 193 may include a built-in network adapter, network interface card, PCMCIA network card, card bus network adapter, wireless network adapter, USB network adapter, modem or any other device suitable for interfacing the computing device 180 to any type of network capable of communication and performing the operations described herein. Moreover, the computing device 180 may be any computer system, such as a workstation, desktop computer, server, laptop, handheld computer, tablet computer (e.g., the iPad™ tablet computer), mobile computing or communication device (e.g., the iPhone™ communication device), or other form of computing or telecommunications device that is capable of communication and that has sufficient processor power and memory capacity to perform the operations described herein.

The computing device 180 may run any operating system 195, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 195 may be run in native mode or emulated mode. In an exemplary embodiment, the operating system 195 may be run on one or more cloud machine instances. In some embodiments, the computing device 180 can be communicatively coupled to the imaging device 160.

In an exemplary operation, to estimate a spectral reflectance of the surface 122 a scene that contains the color target 100 is captured as an image by the imaging device 160. For example, an image of the color target 100 can be captured by the imaging device 160 after the imaging device has been set up to have a specified position (e.g., location and orientation) relative to the color target 100 (and/or the scene within which the color target is disposed). The image can be input to the spectral analysis engine 182, and the spectral analysis engine 182 can receive and/or determine one or more parameters or characteristics associated with a response of the channels (e.g., Red, Green, Blue) of the imaging device 160, lighting of the environment within which the image is captured, and a model of the filter covering at least a portion of the surface 122. The image captured by the imaging device 160 can be processed using the one or more parameters and/or characteristics to estimate the spectral reflectance of the surface 122 via the spectral analysis engine 182, which can be implemented by the imaging device 160 and/or the computing device 180, as described herein.

By covering a portion of the surface 122 with the filters 132, 134, and 136, exemplary embodiments of the present disclosure can facilitate estimation of the spectra for the surface 122 using a single image captured by camera 105. The filters over the surface allow the estimation of spectra for the surface. The use of a single image ensures that lighting and camera position do not change between exposures. The use of a single image to estimate the spectra of the surface 122 advantageously ensures that the different portions of surface 122 are exposed to the same lighting and are captured by the camera 105 when the camera is in a substantially stable position (e.g., a fixed location and orientation). By using a single exposure to capture an image of the surface 122 with the filters 130, exemplary embodiments of the present disclosure avoid the disadvantages commonly encountered from using multiple exposures including possible changes in the lighting and in the position of the camera between exposures without requiring specialized camera equipment, such as complex optical elements that would otherwise be required to capture an image of the same locations in a scene with a single exposure and different filters.

While the filters 130 can be used to recognize several advantages in accordance with exemplary embodiments of the present disclosure, in some embodiments, care must be taken to control and/or adjust for potential issues that the filters 130 may introduce when capturing an image. For example, some potential issue that may be address can include reflections from the surface of the filters 130 and internal reflections of the light that has entered the filters 130. In some embodiments, anti-reflective coatings can be used to reduce the effect of these issues.

Figure 2:
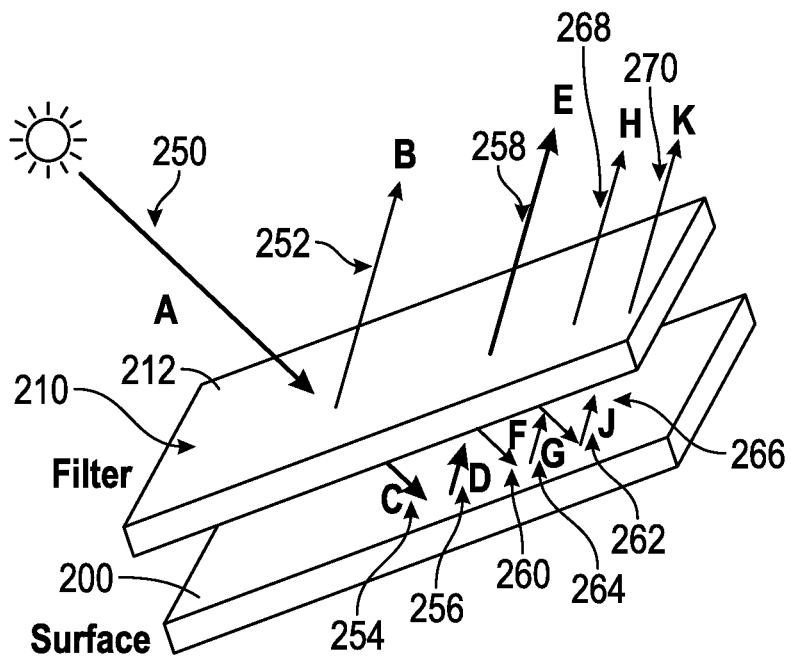
FIG. 2 depicts a portion of the color target substrate of FIG. 1 and a response of the portion of substrate to light incident upon the portion of the substrate in accordance with exemplary embodiments of the present disclosure.

FIG. 2 depicts a portion of a sample surface 200 in a sample window covered by a filter 210, and depicts a response of the portion of the sample window to light incident upon the filter 210 and the sample surface 200 in accordance with exemplary embodiments of the present disclosure. There are several potential light paths that can be followed when one or more filters are placed over the surface to be measured. As shown in FIG. 2, incoming light A (denoted by arrow 250) is incident upon a surface 212 of a filter 210. Some of the incoming light A reflects from the surface 212 as reflected light B (denoted by arrow 252). If the filter is very glossy, the reflectance off of the surface 252 can be very high at the specular angle. Some of the incoming light A also passes through the filter 210 as transmitted light C (denoted by arrow 254), which impinges upon the sample surface 200. The transmitted light C can be reflected from the sample surface 200 as reflected light D (denoted by arrow 256). Some of the reflected light D passes back through the filter 210 as transmitted light E (denoted by arrow 258). Some the reflected light D is reflected back towards the sample surface 200 as reflected light F (denoted by arrow 260) and reflected light I (denoted by arrow 262). The reflected light F illustrates reflections from a surface 214 of the filter 210, and the reflected light I illustrates reflections from the surface 212 of the filter 210. The reflected light F and I can impinge upon the sample surface 200, which can again reflect the light F and I as reflected light G and J (denoted by arrow 264 and reflected light J (denoted by arrow 266), respectively. The reflected light G and J can pass through the filter 210 as transmitted light H (denoted by arrow 268) and transmitted light K (denoted by arrow 270), respectively.

Exemplary embodiments of the present disclosure can be configured to control the light B that reflects off of the surface 212 of the filter 210. As one example, a specular reflectance can be detected on the filter, and the light, target, or camera can repositioned to avoid the specular reflection. In exemplary embodiments, a specular reflection can be detected by sensing if a location with the filter 210 that has an image value (e.g., one or more values of one or more RGB pixels at a corresponding image location for the filter) that is larger than an image value of a white patch on the color target (e.g., one or more values of one or more RGB pixels at a corresponding image location for the white patch). As another example, a specular reflectance can be detected using a very dark glossy patch on the target. This patch is generally unaffected by the reflectance properties of the surface being measured. The dark glossy patch can be formed on the target by placing a filter over a dark patch on the target or by coating the bottom of a filter disposed on the target with a dark material. As yet another example, a dark patch can be laminated with a coating that matched the properties of a filter disposed on the target.

Non-specular reflections from the filter can be controlled using a dark patch with a gloss that matches the gloss of the filter. Non-glossy patches on the target can be used to estimate the reflection of the patch without any specular component. The difference can be subtracted out of the image values (e.g., RGB pixel values) of the patches that have filters.

Figure 3:
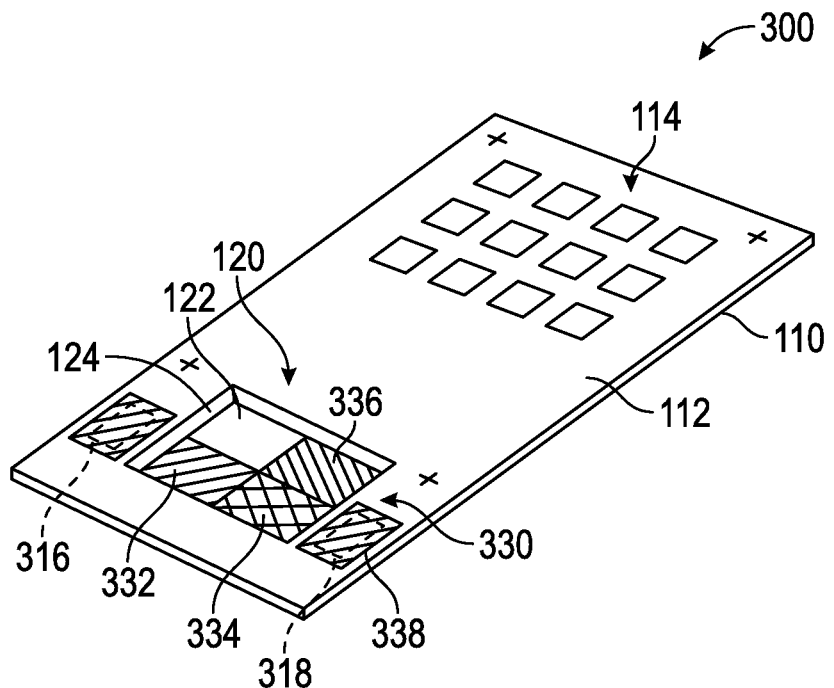
FIG. 3 depicts a color target substrate in accordance with exemplary embodiments of the present disclosure.

FIG. 3 depicts a color target 300 in accordance with exemplary embodiments of the present disclosure. The color target 300 can be defined by the substrate 110 having the (first) target surface 112 upon which the one or more color patches 114 are formed. The substrate 110 of the color target 300 can include the sample window 120 having the second surface 122 that is recessed with respect to the target surface 112. One or more filters 330 can be disposed over the sample window 120 to cover at least a portion of the surface 122 and leave at least a portion of the surface 122 exposed. As a non-limiting example, the filters 330 can have a quadrant arrangement with a first filter 332 disposed substantially over a first quadrant of the sample window 120 to obstruct a first portion of the surface 122. In exemplary embodiments, at least a portion of the first filter 332 can extend beyond the perimeter 124 of the sample window 120 to cover at least a portion 316 of the surface 112. A second filter 334 can be disposed substantially in a second quadrant of the sample window 120 to obstruct a second portion of the surface 122. A third filter 336 can be disposed substantially in a third quadrant of the sample window 120 to obstruct a third portion of the surface 122. The fourth quadrant of the sample window 120 can be unobstructed by the filters 332, 334, and 336 such that a forth portion of the surface 122 is exposed. In some embodiments, a separate filter 338 having substantially similar parameters as at least one of the filters 332, 334, and/ 336 can be disposed on the surface 112 to cover at least a portion 318 of the surface 112.

In exemplary embodiments, the filters 332, 334, 336, and 338 can be formed to have a transmittance corresponding to one or more colors or ranges of wavelengths. For example, in some embodiments, the filters 332 and 338 can be configured to have a first predominant transmittance to a range of wavelengths corresponding to one or more selected colors, the filter 334 can be configured to have a second predominant transmittance to a range of wavelengths that corresponds to one or more selected colors, the filter 336 can be configured to have a third predominant transmittance to a range of wave lengths corresponding to one or more selected colors. In exemplary embodiments, the transmittance is chosen so that part of the color range to which an image sensor channel is sensitive is filtered and part of the color range to which the image sensor is sensitive is not filtered.

The portions 316 and/or 318 of the surface 112 covered by the portion 332 of the filter 332 and/or the filter 338, respectively can be formed as dark color patches (e.g., black patches). By disposing the portion of the filter 132 and/or the filter 338 over dark color patches formed on the surface 112, exemplary embodiments of the present disclosure can facilitate estimation of a spectral reflectance associated with the surfaces 112 and/or 122 of the color target 300. In some embodiments, for each type of filter surface (e.g., glossy or matte) covering the color sample, there can be a filter of the same surface type covering a black patch.

Figure 4:
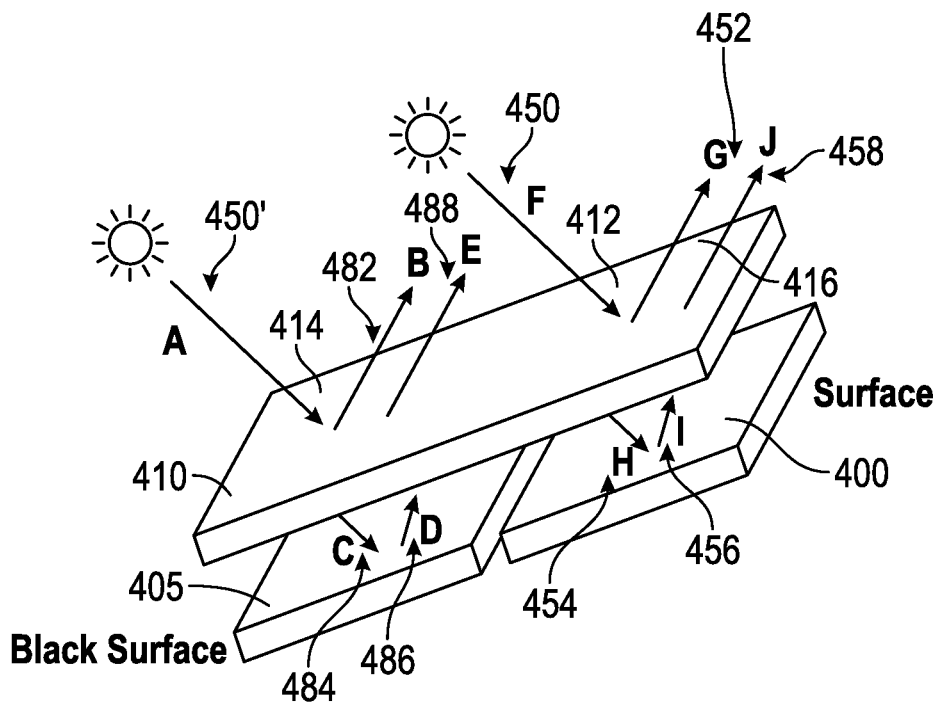
FIG. 4 depicts a portion of the color target substrate of FIG. 3 and a response of the portion of substrate to light incident upon the portion of the substrate in accordance with exemplary embodiments of the present disclosure.

FIG. 4 depicts a response to light that is incident upon a sample surface 400 covered by a portion 412 of a filter 410 and a black surface 405 covered by a portion 414 of the filter 410 for a color target in accordance with exemplary embodiments of the present disclosure. The sample surface 400 can be disposed within a perimeter of a sample window of the color target and the black surface 405 can be disposed outside of a perimeter of the sample window of the color target. In some embodiments, for each type of filter surface (glossy or matte) covering the color sample, there can be a filter of the same surface type covering a black patch. As shown in FIG. 4, incoming light A and F (denoted by arrows 450' and 450, respectively) is incident upon a surface 416 of the filter 410. Some of the incoming light A (denoted by arrow 450') reflects from the from the surface 416 of the filter as reflected light B (denoted by arrow 482). Some of the incoming light A also passes through the filter 410 as transmitted light C (denoted by arrow 484), which impinges upon the black surface 405. The transmitted light C can be reflected from the black surface 405 as reflected light D (denoted by arrow 486). Some of the reflected light D passes back through the filter 410 as transmitted light E (denoted by arrow 488). Likewise, incoming light F (denoted by arrow 450), which can radiate from the same light source as the light A, is incident upon a surface 416 of the filter 410. Some of the incoming light F reflects from the surface 416 as reflected light G (denoted by arrow 452). Some of the incoming light F also passes through the filter 410 as transmitted light H (denoted by arrow 454), which impinges upon the surface 400. The transmitted light H can be reflected from the surface 400 as reflected light I (denoted by arrow 456). Some of the reflected light I passes back through the filter 410 as transmitted light J (denoted by arrow 458).

In exemplary embodiments, the light E reflected from the black surface that passes back through the filter can be estimated by using color patches on the target and a model of how light is affected by the filter. The difference between the light E and the image value (e.g., RGB pixel values) can be used to find a value for the light B. If the light B is assumed to be close to the light G, then the light J can be found by subtracting the light B from the image value for the surface.

In some embodiments, digital processing of color values from a color sensor of an image capturing device (e.g., a digital camera) can make the colors of a captured scene more pleasing when viewed by a person. In such embodiments, accuracy and preservation of signal information are typically lower priorities. As a result, significant color information can be lost post processing of the captured image by the image capturing device. The loss of color information for colors with high chroma can be especially large. As one example, when two bright red surfaces with similar but different colors are captured by a digital camera, the image sensor in the digital camera can return, for example, a color value of (180,30,10) for one surface and (183,25,3) for the other. The digital processing in the digital camera can transform the colors from the image sensor to (255,0,0) for the first surface and (255,0,0) for the second surface, thereby making the color of the two surfaces indistinguishable resulting in a loss of color information. As another example, when two dull red surfaces with similar but different colors are captured by a digital camera, the image sensor in the digital camera can return a color value of (120,80,60) for one surface and (125,72,65) for the other. The digital processing in the digital camera can transform the colors from the sensor to (180,15,8) for the first surface and (190,10,12) for the second surface; thereby making the color of the two surfaces distinguishable. One reason the dull red colors can be distinguished while the bright reds cannot be distinguished in the above examples can result from the color representation method used by digital cameras. For example, the digital camera can use a color representation method, referred to as sRGB, which is defined by IEC 61966-2-1: 1999. This color representation method typically cannot represent the full gamut of colors that humans can perceive such that an imaging device using sRGB has a color gamut that represents a subset of colors of the full gamut of colors that humans can perceive.

As a result, the when an image capturing device captures colors that are outside of the color gamut employed by an image capturing device, the color representation method can map the colors into the device's color gamut (e.g., the sRGB color gamut), for example, by clipping one or more components associated with the color in a scene (e.g., the individual red, green, and blue components can be clipped to 0.0 or 255.0). This mapping into a restricted color space like sRGB can make it difficult, if not impossible, to accurately measure colors that are outside of the gamut of colors of the space used by imaging devices employing a color representation method have a constrained color gamut. In some embodiments, the limitations of constrained color gamuts (e.g., sRGB) can be advantageously overcome if the colors to be measured using images captured by an imaging device employing a constrained color gamut can be moved into the usable color space of the image capturing device before the colors are captured by the image capturing device. In some embodiments, a filter with a matte finish or diffusion properties can be placed over a surface color to be measured to alter the color. For example, in exemplary embodiments, one or more of the filters (e.g., filters 130, 330) of the color targets (e.g., color targets can have a matte finish in accordance with embodiments of the present disclosure.

Figure 5:
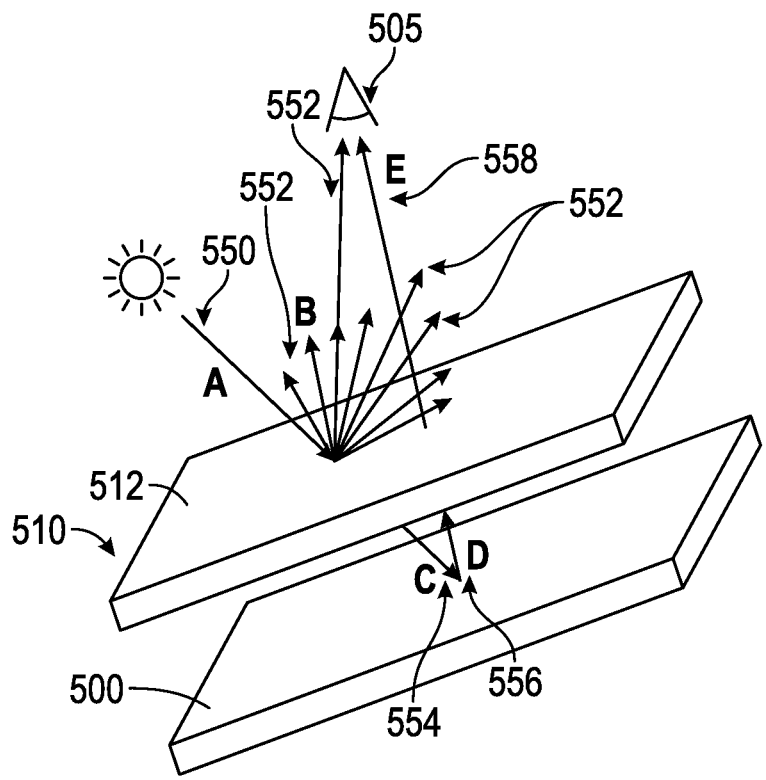
FIG. 5 depicts a response of a portion of a sample surface in a sample window covered by a filter having a matte surface in accordance with exemplary embodiments of the present disclosure.

FIG. 5 depicts a response of a portion of a sample surface 500 in a sample window covered by a filter 510 for a color target in accordance with exemplary embodiments of the present disclosure. The filter 510 can have a matte surface or diffusion properties 512 that causes some of the light falling on the filter surface 512 to reflect back in all directions. As shown in FIG. 5, light A (denoted by arrow 550) travels from a light source to the surface 512 of the filter 510 and some of the light is reflected at different angles from the surface 512 of the filter 500 as reflected light B (denoted by arrow 552). Some of the light A passes through the filter 510 as transmitted light C (denoted by arrow 554) and is reflected from the surface 500 as reflected light D (denoted by arrow 556). The reflected light D passes back through the filter 510 towards an observer 505 (e.g., an image capturing device) as transmitted light E (denoted by arrow 558). The observer sees a combination of some of the light B that is reflected from the filter surface 512 and the light F that is transmitted through the filter 500. The color of the combined light viewed/captured by the observer is between the color of the light source and the color of the filtered surface 500.

Figure 6:
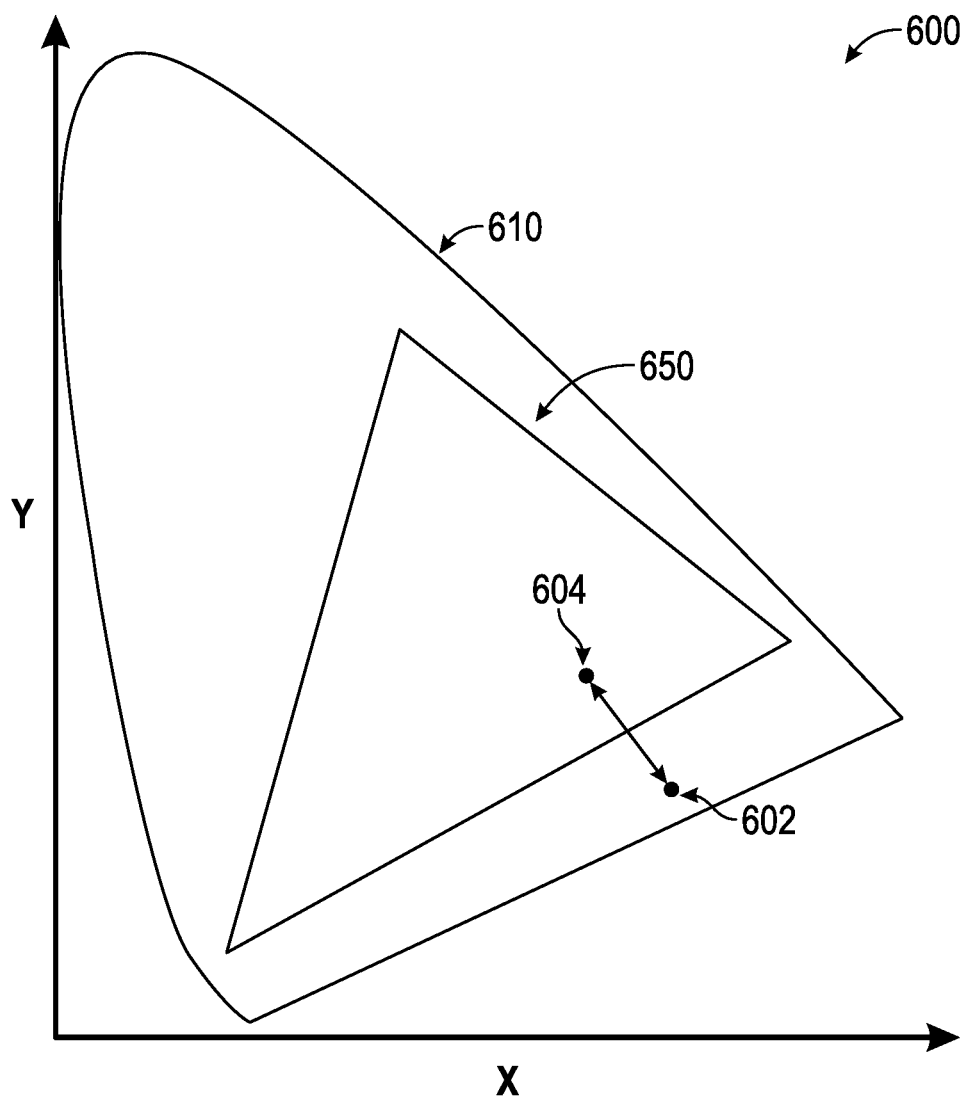
FIG. 6 is a graph illustrating exemplary color spaces in accordance with embodiments of the present disclosure.

FIG. 6 is a graph 600 illustrating exemplary color spaces in accordance with embodiments of the present disclosure. The graph 600 includes a color gamut 610 that corresponds to a full gamut of colors that humans can perceive, and includes a color gamut 650 that corresponds to a color space of an image capturing device (e.g., a digital camera). As shown in FIG. 6, the color gamut 650 includes a subset of colors of the color gamut 610. As a non-limiting example, the color gamut 650 can reflect the sRGB color gamut. Colors that are outside of the color gamut 650 can be clipped by the image capturing device via digital processing. As described herein, exemplary embodiments of the present disclosure can improve color measurement of a sample surface of a color target by ensuring that the color of the sample surface is altered (if necessary or desired) to fall within the color gamut 650 of the image capturing device by using a filter having a matte finish or diffusion properties (e.g., filter 510 of FIG. 5). For example, the color of a sample surface on a color target can be represent in the graph by a point 602.

By placing a filter with a matte surface or diffusion properties over at least a portion of the sample surface, the color of the sample surface is shifted into the color gamut 610 before an image of the sample surface is captured. For example, the color can be shifted from the point 602 to a point 604 within the color gamut 650. Shifting the color from the point 602 to the point 604 allows the image capturing device to observe a color that is within the gamut of colors of the image capturing device, which can be accurately represented with the image capturing device's digitally processed color values. The original color of the sample surface can then be calculated using, e.g., Equation 3 below and parameters that have been estimated for the filter with a matte surface or diffusion properties.

Figure 7A:
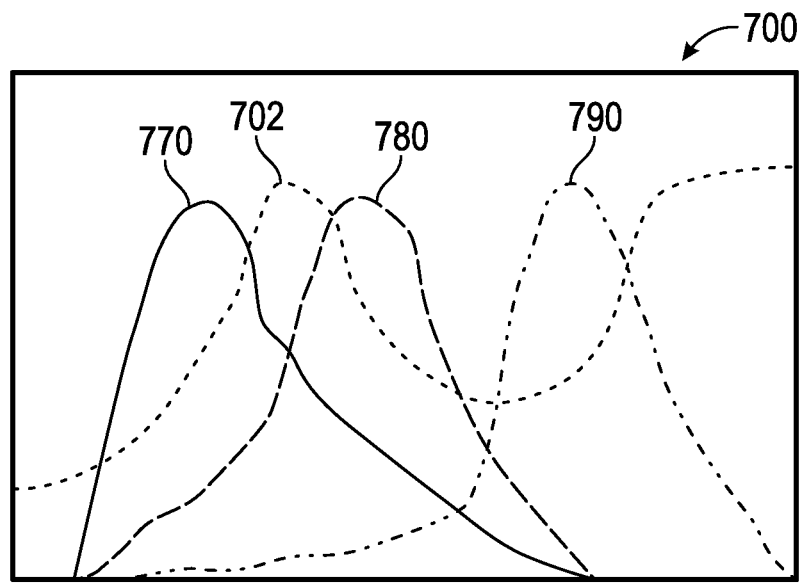
FIGS. 7A-B depict exemplary transmittance spectrums for various filter designs that can be used to facilitate color measurement accuracy in accordance with exemplary embodiments of the present disclosure.
Figure 7B:
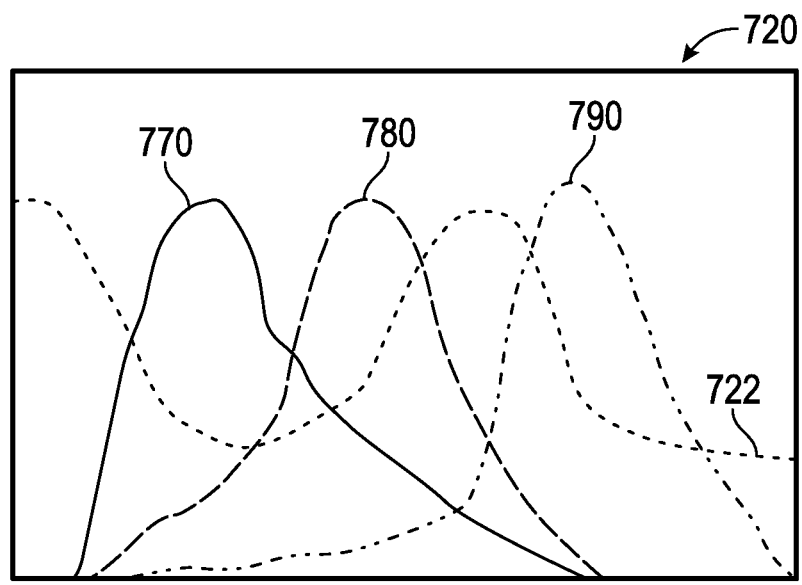

FIGS. 7A-B are graphs 700 and 720 depicting exemplary transmittance spectrums 702 and 722 for exemplary filter designs that can be used to facilitate color measurement accuracy in accordance with exemplary embodiments of the present disclosure. As shown in FIGS. 7A-B, the sensitivity spectrum of an imaging device, such as a digital camera, can include curves 770, 780, and 790, which correspond to a color sensitivity spectrum of the blue channel, green channel, and red channel of the imaging device's sensitivity spectrum, respectively. In exemplary embodiments, the filters disposed on color targets can be configured to effectively increase the number of channels of information that an imaging device captures, e.g., by maximizing the output from all channels of the camera while also filtering out a significant part of the spectrum to which the channel was sensitive. The filters can be formed to take into account that the light will pass through the filters twice. In some embodiments, the color target can include a sample surface within the perimeter of a sample window where a portion of the sample surface is covered by one or more filters and another portion of the sample surface is not covered filters. Referring to graphs 700 and 720 of FIGS. 7A-B, the sensitivity spectrums 702 and 722, respectively, both allow a substantial amount of light through the color channels (e.g., red channel, green channel, and blue channel) in the imaging device. The sensitivity spectrums 702 and 722 also filter out significant portions of the spectrum for color channels of the imagining device.

Figure 8:
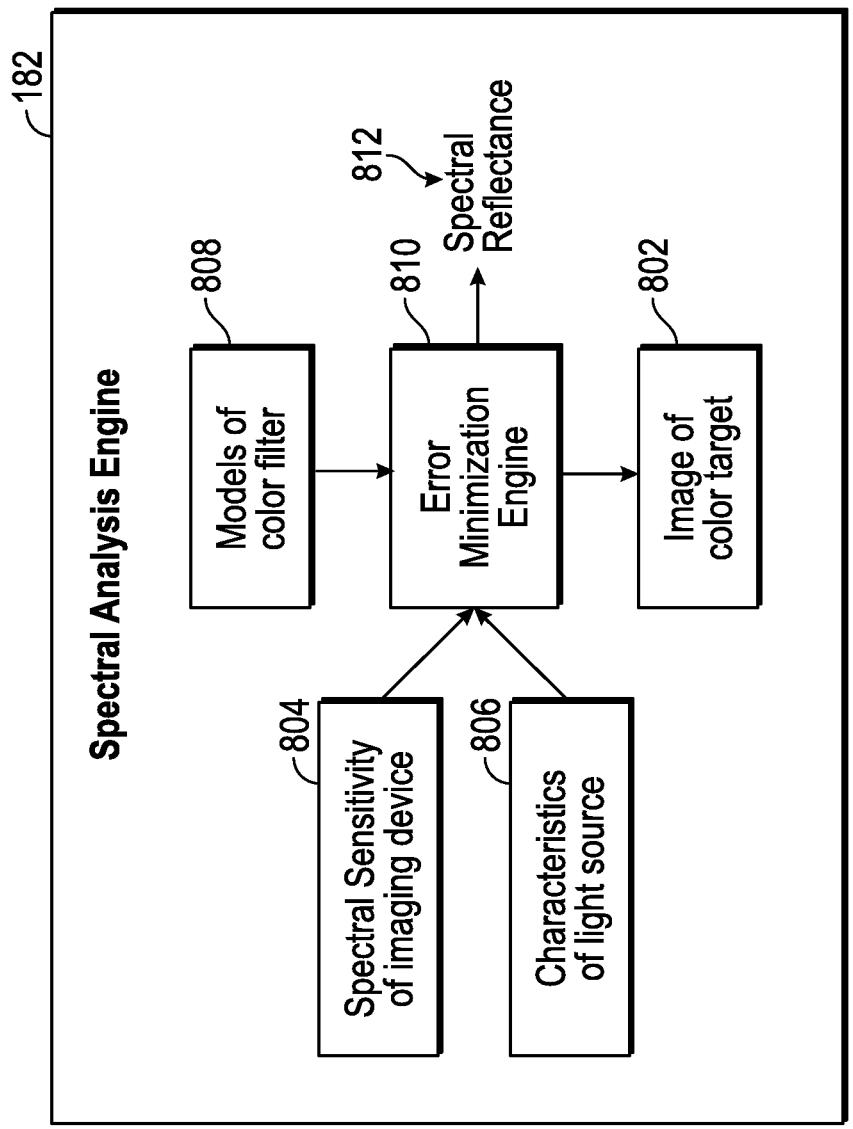
FIG. 8 is a block diagram depicting an exemplary spectral analysis engine in accordance with exemplary embodiments of the present disclosure.

FIG. 8 is a block diagram illustrating an exemplary embodiment of the spectral analysis engine 182. To estimate the spectral reflectance of surface(s) of a color target in an image 802 captured by an imaging device (e.g., the imaging device 160), the spectral analysis engine 182 obtains a spectral sensitivity 804 of the imaging device, one or more characteristics 806 of the light source (e.g., intensity, wavelength, power spectral density, etc.) within which the image is captured, and one or more models 808 of one or more filters disposed over the surface(s) of the color target for which the spectral reflectance is to be determined.

In exemplary embodiments, the spectral sensitivity 804 of an imaging device can be obtained by using one or more well know methods, such as monochromatic light. The response of a camera to a surface can be expressed as the following equation:

$$P_i = \sum_{l=1}^{m} A(\lambda_l) R(\lambda_l) Q_i(\lambda_l) \quad (1)$$

where $p_i$ is the response of the imaging device for channel i (e.g., i=R, G, B, where R=1, G=2, and B=3); $A(\lambda_l)$ is the spectral power distribution of the scene illuminant; $R(\lambda_l)$ is the surface reflectance; $Q_i(\lambda_l)$ is the spectral sensitivity for channel i.

An accurate estimation of a surface reflectance generally requires an accurate estimation of the light source (e.g., an estimation of one or more characteristics 806 of the light source). In an arbitrary environment it may be difficult to accurately estimate the light sources in the environment. To address these difficulties, exemplary embodiments of the present disclosure can use a known light source, such as the flash 166 on imaging device 160. An image taken with the flash 166 can still have light from the scene that may have unknown characteristics. This extraneous light can be subtracted from the image captured using the imaging device 160 by capturing the same scene using multiple exposures where the flash 166 is on in one exposure and off in another. Enhanced results can be achieved when the light level of the environment is low in comparison to the light level of the flash, and when the position of the imaging device and lighting conditions do not change significantly between exposures.

The one or more models 808 of how light interacts with the filter(s) and the surface(s) of the color target covered by the filter(s) can be defined. As a non-limiting example, an exemplary model can be defined by the following mathematically expression to account for the reflected light E shown FIG. 2.

$$E_v = AT_f^2 R_s \quad (2)$$

where $E_v$ is the light that observed by the camera; A is the light source; $T_f$ is the transmittance of the filter; and $R_s$ is the reflectance of the surface. A more complex model can be defined by the following mathematical expression to account the reflected light E and for reflections from the surface of the filter(s) (e.g., the reflected light B).

$$E_v = aAT_f^2 R_s + bAT_f^2 R_s^2 + cAT_f^4 R_s + dAT_f^4 R_s^2 + eAT_f^3 R_s + fAT_f^3 R_s^3 + g \quad (3)$$

where a, b, c, d, e, f and g are parameters to the model.

As a non-limiting example, upon obtaining the above information, the surface reflectance 812 of the surface(s) can be determined by an error minimization module 810 of the spectral analysis engine 182 that uses constrained non-linear optimization. The error function utilized by the error minimization module 810 can minimize the difference between the observed response of the imaging device 160 and a predicted response of the imaging device. For a color target with a portion of the sample surface covered a filter and a portion of the surface that is not covered by the filter (i.e. exposed), the error can be determined by the error minimization module 810 by evaluating the following mathematic expression:

$$err=\Sigma_{i=1}^{3}((o_i-\Sigma_{l=1}^{m}A(\lambda_l)R(\lambda_l)Q_i(\lambda_l))^2+\Sigma_{k=1}^{n}(o_{i,k}-\Sigma_{l=1}^{m}E_{v,k}(\lambda_l)Q_i(\lambda_l))^2) \quad (4)$$

where err is the error that is to be minimized; $o_i$ is the observed camera response for channel i (e.g., i=R, G, or B, where R=1, G=2, and B=3) for the surface with no filter; $A(\lambda_l)$ is the spectral power distribution of the scene illuminant; $R(\lambda_l)$ is the surface reflectance; $Q_i(\lambda_l)$ is the spectral sensitivity for channel i; $o_{i,k}$ is the observed camera response for channel i for the surface covered by an $n^{th}$ filter k (n is the number of filters), and $E_{v,k}$ is the predicted spectral power distribution from the surface covered by the $n^{th}$ filter k.

In some embodiments, the constraints to the non-linear optimization algorithm can constrain the spectral reflectance to be greater than zero. In some embodiments, a further constraint can constrain the reflectance to 100% or less if fluorescence is assumed to be negligible. If fluorescence is non-negligible, the maximum reflectance can be set to a value that is appropriate for the assumed level of fluorescence.

Many methods of constrained non-linear optimization are suitable for solving for spectral reflectance. For example, in some embodiments, sequential quadric programming can be utilized for determining spectral reflectance.

The accuracy of the estimation of the spectral reflectance of the surface(s) can be further improved by including smoothness constraints on reflectance curves correspond to estimated spectral reflectance of the surface(s). In addition, or in the alternative, the equation 3 can be altered so that high frequency content in the reflective curves generates an increase in the estimated error.

Figure 9C:
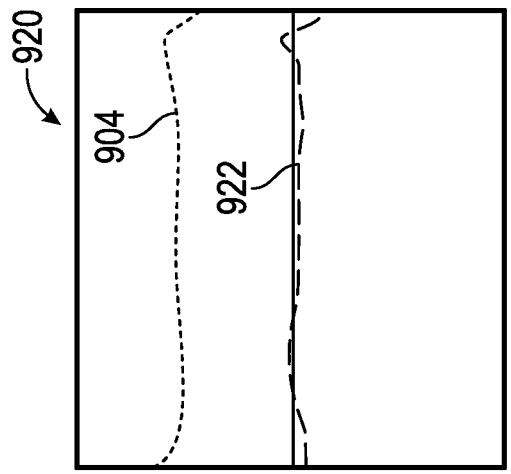
FIGS. 9A-C depict graphs showing an effect of smoothness constraints on reflectance curve associated with a color target substrate in accordance with exemplary embodiments of the present disclosure.
Figure 9B:
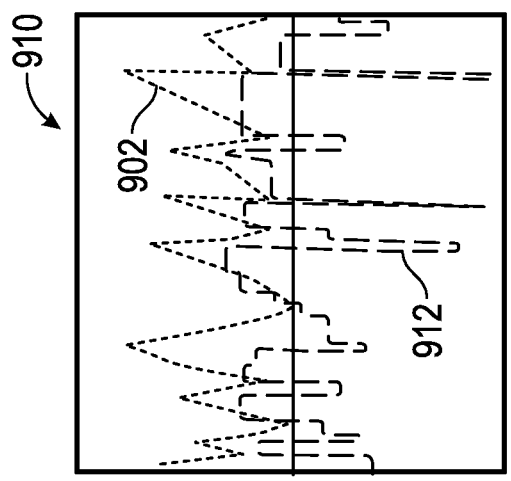
Figure 9A:
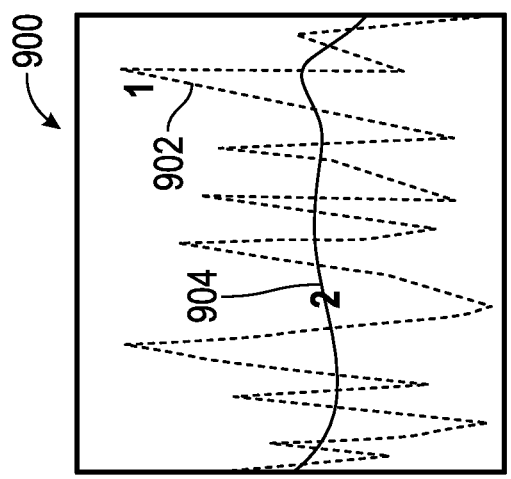

FIGS. 9A-C illustrate spectral reflectance curves and their first derivatives. FIG. 9A shows a graph 900 that includes a curve 902, which is jagged and is not likely to represent the reflectance of a real surface, and a curve 904, which is smoother than the curve 902 and is typical of many surface reflectances. The average absolute value of the first order derivative of the curve 902 is substantially greater than the average absolute value of first order derivative of the curve 904. For example, FIG. 9B shows a graph 910 that includes the curve 902 and a curve 912, which is representative of the first derivative of the curve 902. FIG. 9C shows a graph 920 that includes the curve 904, and a curve 922, which is representative of the first derivative of the curve 904. The error equation (e.g., equation 3) utilized by embodiments of the spectral analysis engine (e.g., engine 182) can be modified so that it includes the average absolute value of the first order derivate of the estimated reflectance curve (e.g., similar to curve 904). A further potential improvement could use colors on the target with known reflectances to adjust the spectral sensitivities of the imaging device and/or the spectral power distribution of the illumination source.

Figure 10:
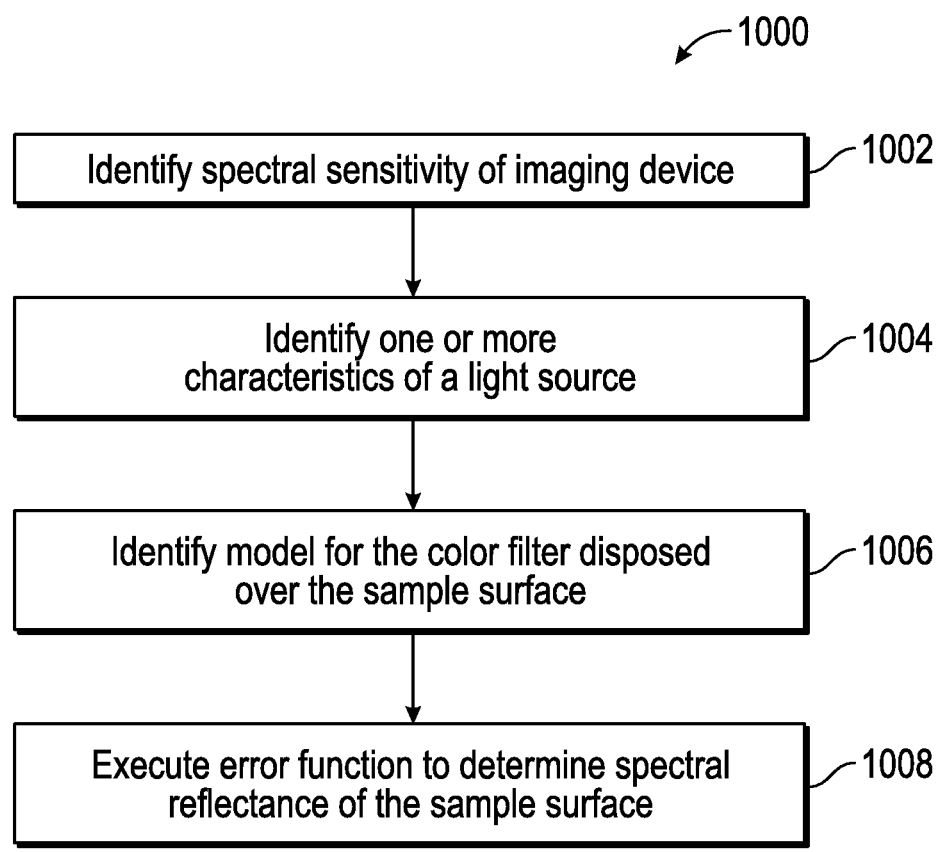
FIG. 10 is a flowchart illustrating an exemplary process for estimating a spectral reflectance in accordance with embodiments of the present disclosure.

FIG. 10 is a flowchart illustrating an exemplary process 1000 of estimating a spectral reflectance of a sample surface of a color target (e.g., color target 100 or 300). To begin, at step 1002, a spectral sensitivity of an imaging device utilized to capture an image of the color target is identified. At step 1004, one or more characteristics of a source of light in the environment within which the imaging device captured the image are identified. At step 1006, a model for the filter disposed over the sample surface is identified. At step 1008, an error function is executed using a spectral analysis engine to minimize a difference between an observed response of the imaging device based on the image captured by the imaging device and a predicted response of the imaging device based on the spectral sensitivity of an imaging device, the one or more characteristics of a source of light, and the model for the filter to determine a spectral reflectance of the sample surface.

In describing example embodiments, specific terminology is used for the sake of clarity. For purposes of description, each specific term is intended to at least include all technical and functional equivalents that operate in a similar manner to accomplish a similar purpose. Additionally, in some instances where a particular example embodiment includes a plurality of system elements, device components or method steps, those elements, components or steps may be replaced with a single element, component or step Likewise, a single element, component or step may be replaced with a plurality of elements, components or steps that serve the same purpose. Moreover, while example embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

Example flowcharts are provided herein for illustrative purposes and are non-limiting examples of methods. One of ordinary skill in the art will recognize that example methods may include more or fewer steps than those illustrated in the example flowcharts, and that the steps in the example flowcharts may be performed in a different order than the order shown in the illustrative flowcharts.

The invention claimed is:

1. A color target for use in determining a spectral reflectance of a sample surface, the color target comprising:
   a substrate having a target surface that is adjacent to but does not overlap with the sample surface;
   a sample window within which the sample surface is disposed; and
   one or more filters disposed over the sample surface, wherein the one or more filters is configured to cover a first portion of the sample surface, while leaving a second portion of the sample surface uncovered;
   a dark patch disposed on the target surface that facilitates estimation of a spectral reflectance of at least one of the target surface and the sample surface;
   wherein a gloss of the dark patch, or of the dark patch covered by a filter, matches a gloss of at least one of the one or more filters disposed over the sample surface;
   wherein light reflecting off of the target surface and light reflecting off of the sample surface, including light passing through the one or more filters, reflecting off of the sample surface, and passing back through the one or more filters, can be captured in a single image of the color target.

2. The color target of claim 1, further comprising one or more color patches disposed in the target surface.

3. The color target of claim 1, wherein the at least one of the one or more filters extends beyond a perimeter of the sample window to cover at least a portion of the dark patch.

4. The color target of claim 3, wherein a color of the dark patch is black.

5. The color target of claim 1, further comprising: a further filter disposed over at least a portion of the dark patch.

6. The color target of claim 5, wherein the further filter has a transmittance spectrum that is substantially identical to a transmittance spectrum of the at least one of the one or more filters.

7. The color target of claim 1, wherein the one or more filters is configured to allow a substantial amount of light corresponding to color channels of an imaging device pass through the one or more filters.

8. The color target of claim 1, wherein the one or more filters are configured to filter substantial portions of light corresponding to color channels of an imaging device.

9. The color target of claim 1, wherein the one or more filters are disposed over the sample surface according to a quadrant arrangement,
wherein a first filter of the one or more filters is disposed over the sample surface to cover a first quadrant of the sample surface, a second filter of the one or more filters is disposed over the sample surface to cover a second quadrant of the sample surface, a third filter of the one or more filters is disposed over the sample surface to cover a third quadrant of the sample surface, and a fourth quadrant is uncovered.

10. The color target of claim 1, wherein at least one of the one or more filters has a matte surface or diffusion properties.

11. A method of estimating spectral reflectance, the method comprising:
identifying a spectral sensitivity of an imaging device utilized to capture an image of a color target, the color target having a substrate including a target surface, a sample window formed in the substrate and defining perimeter within which a sample surface is disposed, and one or more filters disposed over the sample surface, the one or more filters is configured to cover a first portion of the sample surface, while leaving a second portion of the sample surface uncovered;
identifying one or more characteristics of a source of light in the environment within which the imaging device captured the image;
identifying a model for the filter disposed over the sample surface;
executing an error function to minimize a difference between an observed response of the imaging device based on the image captured by the imaging device and a predicted response of the imaging device based on the spectral sensitivity of an imaging device, the one or more characteristics of a source of light, and the model for the filter to determine a spectral reflectance of the sample surface.

12. The method of claim 11, wherein executing the error function comprises evaluating the following mathematical expression:

$$\text{err} = \Sigma_{i=1}^{3}((o_i - \Sigma_{l=1}^{m}A(\lambda_l)R(\lambda_l)Q_i(\lambda_l))^2 + \Sigma_{k=1}^{n}(o_{i,k} - \Sigma_{l=1}^{m}E_{v,k}(\lambda_l)Q_i(\lambda_l))^2)$$

where err is an error that is to be minimized; $o_i$ is an observed camera response for channel i for the sample surface with no filter; $A(\lambda_l)$ is a spectral power distribution of the source of light; $R(\lambda_l)$ is a surface reflectance; $Q_i(\lambda_l)$ is a spectral sensitivity for channel i; $o_{i,k}$ is an observed camera response for channel i for the surface covered by an $n^{th}$ filter k; n is a number of filters; and $E_{v,k}$ is a predicted spectral power distribution from the sample surface covered by the $n^{th}$ filter k.

13. The method of claim 11, wherein the color target includes a dark patch disposed on the target surface, and at least one of the one or more filters extends beyond the perimeter of the sample window to cover at least a portion of the dark patch.

14. The method of claim 11, wherein the filter is configured to allow at least some of the color range of light corresponding to color channels of an imaging device pass through the one or more filters and to filter at least some of the color range of the light corresponding to the color channels of the imaging device.

15. The method of claim 11, wherein identifying one or more characteristics of the source of light in the environment within which the imaging device captured the image comprises processing a plurality of images captured by the imaging device, wherein at least one of the images is captured without a flash of the imaging device being activated and at least one of the images is captured with the flash being activated.

16. A system for estimating a spectral reflectance of a surface captured in an image by an imaging device, the system comprising:
a non-transitory computer readable medium storing the image; and
a processing device programmed to:
identify a spectral sensitivity of an imaging device utilized to capture an image of a color target, the color target having a substrate including a target surface, a sample window formed in the substrate and defining perimeter within which a sample surface is disposed, and one or more filters disposed over the sample surface, the one or more filters is configured to cover a first portion of the sample surface, while leaving a second portion of the sample surface uncovered;
identify one or more characteristics of a source of light in the environment within which the imaging device captured the image;
identify a model for the filter disposed over the sample surface;
execute an error function to minimize a difference between an observed response of the imaging device based on the image captured by the imaging device and a predicted response of the imaging device based on the spectral sensitivity of an imaging device, the one or more characteristics of a source of light, and the model for the filter to determine a spectral reflectance of the sample surface.

17. The system of claim 16, wherein the non-transitory computer-readable medium and the processing device reside in the imaging device.

18. The system of claim 17, wherein the processing device is a digital signal processing device.

19. The system of claim 16, wherein the non-transitory computer-readable medium and the processing device reside in a computer.

20. The system of claim 16, wherein the processing device is configured to execute the error function by evaluating the following mathematical expression:

$$\text{err} = \Sigma_{i=1}^{3}((o_i - \Sigma_{l=1}^{m}A(\lambda_l)R(\lambda_l)Q_i(\lambda_l))^2 + \Sigma_{k=1}^{n}(o_{i,k} - \Sigma_{l=1}^{m}E_{v,k}(\lambda_l)Q_i(\lambda_l))^2)$$

where err is an error that is to be minimized; $o_i$, is an observed camera response for channel i for the sample surface with no filter; $A(\lambda_l)$ is a spectral power distribution of the source of light; $R(\lambda_l)$ is a surface reflectance; $Q_i(\lambda_l)$ is a spectral sensitivity for channel i; $o_{i,k}$ is an observed camera response for channel i for the surface covered by an $n^{th}$ filter k; n is a number of filters; and $E_{v,k}$, is a predicted spectral power distribution from the sample surface covered by the $n^{th}$ filter k.

21. The system of claim 16, wherein the color target includes a dark patch disposed on the target surface, and at least one of the one or more filters extends beyond the perimeter of the sample window to cover at least a portion of the dark patch.

22. The method of claim 11, wherein the color target includes a dark patch disposed on the target surface, and a further filter is disposed over at least a portion of the dark patch.

23. The system of claim 16, wherein the color target includes a dark patch disposed on the target surface, and a further filter is disposed over at least a portion of the dark patch.

* * * * *